United States Patent [19]

Kleber et al.

[11] Patent Number: 5,689,636
[45] Date of Patent: Nov. 18, 1997

[54] TRACER SYSTEM FOR ERROR ANALYSIS IN RUNNING REAL-TIME SYSTEMS

[75] Inventors: Ulrich Kleber, Munich; Hans-Joerg Keller, Ottobrunn, both of Germany

[73] Assignee: Siemens Aktiengesellschaft, Munich, Germany

[21] Appl. No.: 313,883

[22] Filed: Sep. 28, 1994

[30] Foreign Application Priority Data

Sep. 28, 1993 [DE] Germany .................. 43 32 993.4

[51] Int. Cl.⁶ .................................................. G06F 11/00
[52] U.S. Cl. ............................. 395/183.21; 364/221.7; 364/207.2; 364/268.1
[58] Field of Search ................... 395/500, 183.21, 395/183.01, 183.08, 183.13, 183.15, 183.22; 364/221.7, 242.4, 264, 266.4, 267.2, 265, 268.1, 942.9, 944.9; 371/3, 5.1, 16.5, 61

[56] References Cited

U.S. PATENT DOCUMENTS

| | | | |
|---|---|---|---|
| 4,126,895 | 11/1978 | Weemaes et al. | 364/200 |
| 4,382,179 | 5/1983 | Penton | 364/200 |
| 4,403,286 | 9/1983 | Fry et al. | 364/200 |
| 4,462,077 | 7/1984 | York | 364/200 |
| 4,511,961 | 4/1985 | Penton | 364/200 |
| 4,845,615 | 7/1989 | Blasciak | 364/265.6 |
| 5,047,919 | 9/1991 | Sterling et al. | 364/264.4 |
| 5,103,394 | 4/1992 | Blasciak | 395/575 |
| 5,127,103 | 6/1992 | Hill et al. | 395/575 |
| 5,265,254 | 11/1993 | Blasciak et al. | 395/700 |
| 5,295,260 | 3/1994 | Pribnow | 395/575 |
| 5,297,274 | 3/1994 | Jackson | 395/500 |
| 5,303,369 | 4/1994 | Borcherding et al. | 395/650 |
| 5,347,649 | 9/1994 | Alderson | 395/425 |
| 5,355,487 | 10/1994 | Keller et al. | 395/700 |
| 5,371,689 | 12/1994 | Tatsuma | 395/575 |
| 5,379,427 | 1/1995 | Hiroshima | 395/650 |

FOREIGN PATENT DOCUMENTS 6187256  12/1992  Japan .................. G06F 13/00

OTHER PUBLICATIONS

IBM Technical Disclosure Bulletin, vol. 34, No. 5, Oct., 1991, "Real-Time, Trace-Driven Monitor for File System Performance", pp. 392–394.

IBM Technical Disclosure Bulletin–vol. 31, No. 8 Jan. 1989–700 IBM Technical Disclosure Bulletin–pp. 450–452.

*Primary Examiner*—Hoa T. Nguyen
*Assistant Examiner*—Dieu-Minh Le
*Attorney, Agent, or Firm*—Hill, Steadman & Simpson

[57] ABSTRACT

Tracer systems should not influence running real-time systems such that the real-time demands thereof can no longer be met. In order to resolve this problem, the tracer system disclosed comprises a monitoring means that identifies the dynamic load on a real-time system caused by the tracer system and deactivates the tracer system when the dynamic load upwardly exceeds a specific threshold.

16 Claims, 3 Drawing Sheets

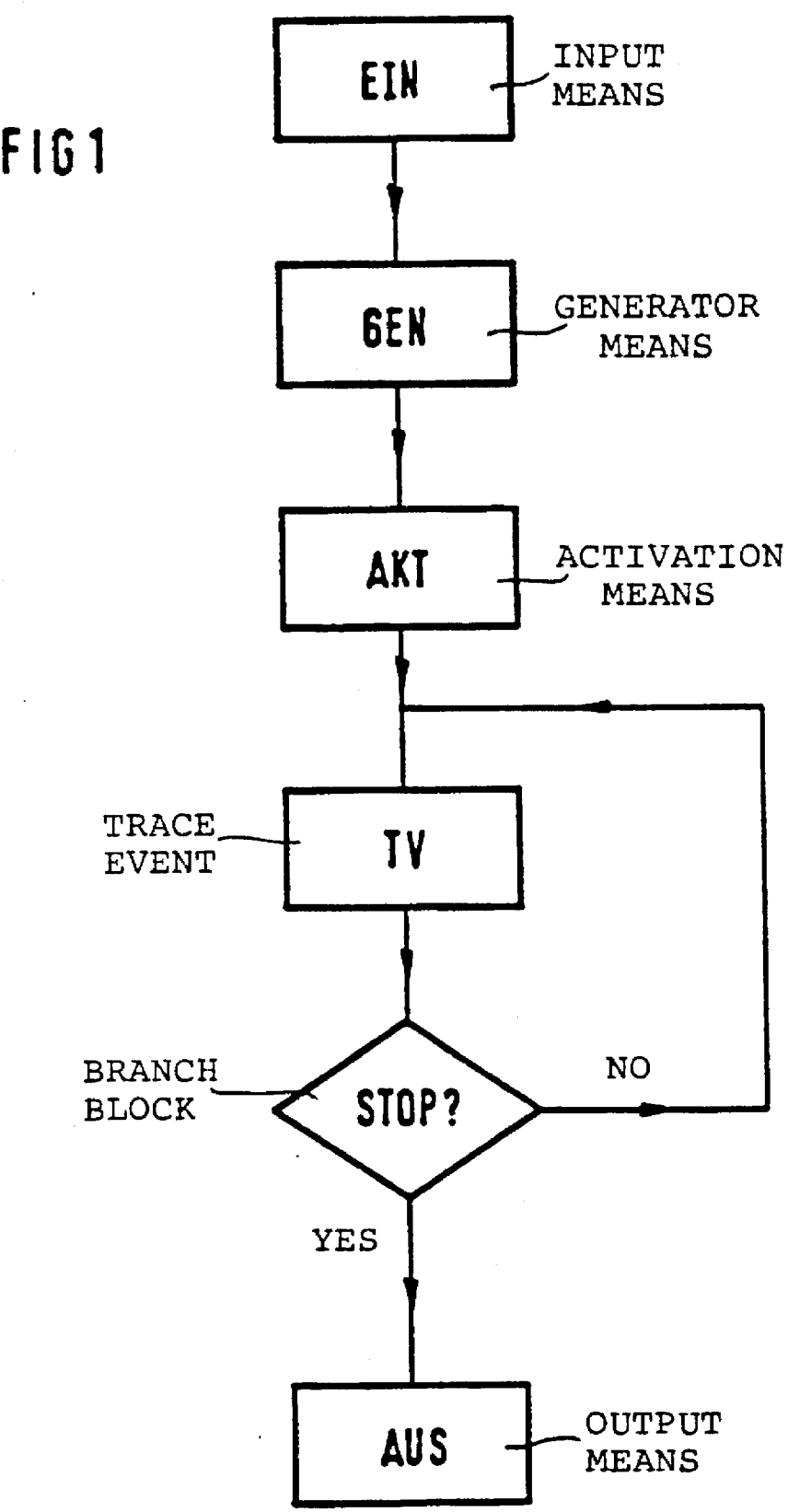

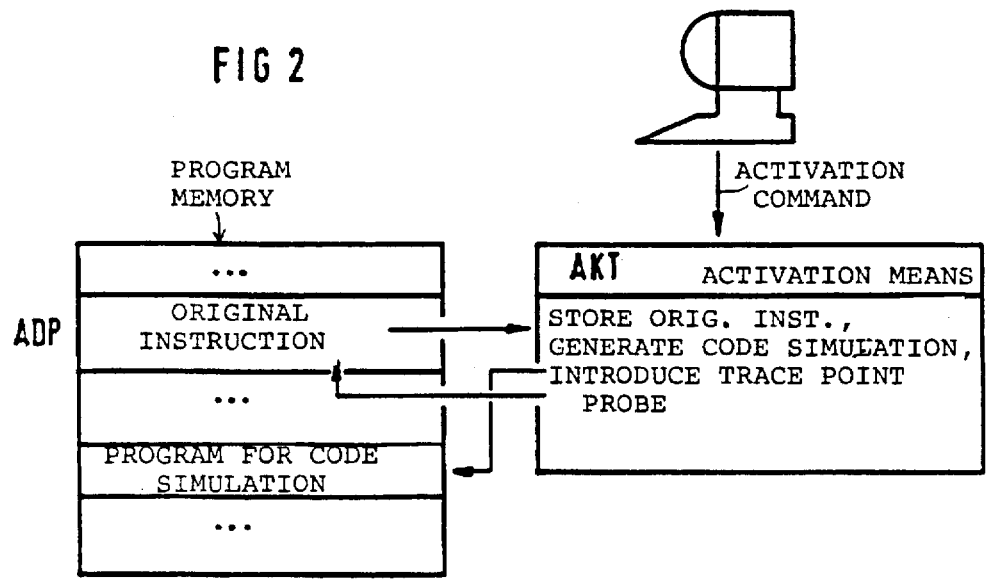
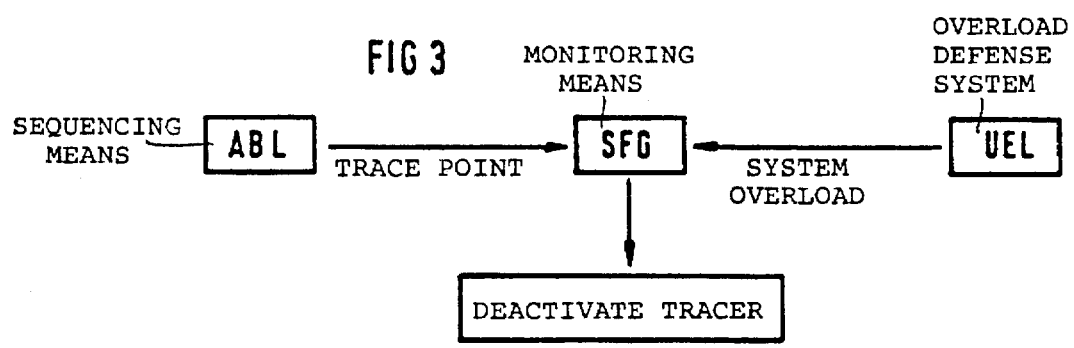

TRACER SYSTEM FOR ERROR ANALYSIS IN RUNNING REAL-TIME SYSTEMS

BACKGROUND OF THE INVENTION

The demand for appropriate possibilities of testing and error analysis has arisen from the development of real-time systems, for example switching systems, that become more and more complex. Thus, there are already a number of error analysis systems that facilitate an error localizing in such complex systems and with whose assistance extensive error analysis procedures can be implemented and registered. What are referred to as "tracer systems" are one example of such test and error analysis systems.

The activation of such tracer systems can influence the real-time behavior of the entire real-time system. These influences arise in that the tracer system must implement additional jobs in the program run and can burden the real-time system such that the real-time demands can no longer be observed or, respectively, the system enters into an overload condition.

This overload problem was previously limited by an overload defense system within the real-time system that limited the plurality of jobs that the real-time system still accepted and thereby prevented a total outage.

SUMMARY OF THE INVENTION

An object of the invention is to prevent the tracer system from having negative consequences on the real-time behavior of the real-time system.

In order to prevent the tracer system from having negative consequences on the real-time behavior of the real-time system, according to the invention a monitor is provided for identifying dynamic load on the real-time system caused by the tracer system and for deactivating the tracer system when the dynamic load upwardly exceeds at least one specific threshold.

Since the tracer system of the invention monitors the dynamic load on the real-time system caused by the tracer system itself and can deactivate itself dependent on this monitoring, it is assured in the tracer system of the invention that it can have no negative consequences for the real-time behavior of the real-time system.

With the invention, a measurement of the dynamic load on the real time system can be performed by the tracer system.

With the invention, the tracer system can deactivate itself given overload, even when the dynamic load caused by the tracer system does not yet upwardly exceed the prescribed threshold or, respectively, the prescribed thresholds.

In one embodiment of the invention, the operator may vary the overload level. As a result thereof, an error analysis by the tracer system is enabled below every overload level.

In a further embodiment of the invention, an unconditional deactivation may be provided.

In another embodiment of the invention, the tracer system makes no special hardware-oriented demands of the real-time system. The monitoring means of the invention for the dynamic self-monitoring of the tracer system is especially important particularly given a software tracer system, since every activity of the tracer system in this case means a dynamic load on the real-time system.

In a further embodiment of the invention, the deactivation of a software-implemented tracer system is prevented from excessively loading the real-time system.

BRIEF DESCRIPTION OF THE DRAWINGS

FIG. 1 shows the execution of a trace method on the basis of the individual software means of a software tracer system;

FIG. 2 shows the function of the activation means of the tracer system;

FIG. 3 shows the function of the inventive monitoring means of the tracer system.

DESCRIPTION OF THE PREFERRED EMBODIMENT

Figure 4:
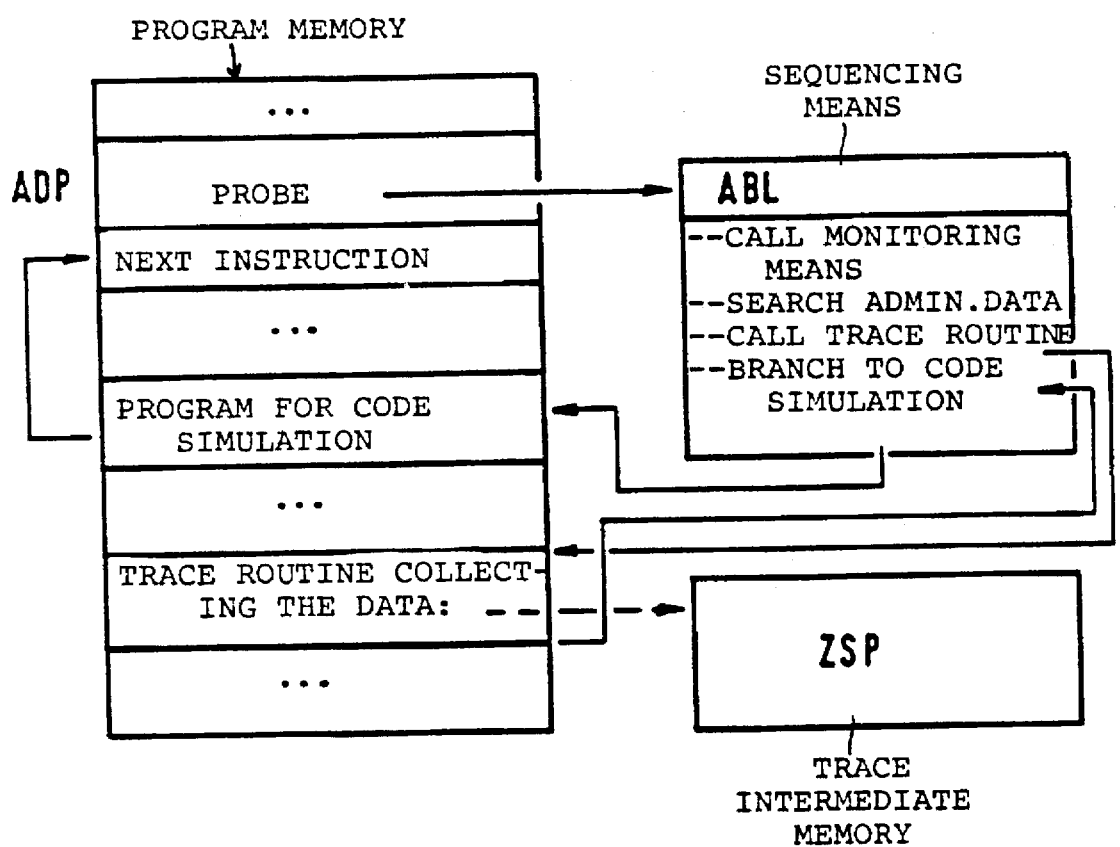
FIG. 4 shows the function of the sequencing means for controlling the execution of the trace procedure.

The fundamental idea of the invention is to expand a tracer system with a monitoring means that calculates the dynamic load on the real-time system caused by the tracer system itself and deactivates the tracer system when the dynamic load upwardly exceeds specific thresholds.

For this purpose, the monitoring means of the invention increments two global counters given every intervention of the tracer system into the real-time system. One of the counters thereby measures the plurality of trace points that are hit during a specific measuring time span, whereas the other counter evaluates the activities of the tracer system at the individual trace points. This evaluation can be based on the plurality of collected data or can directly contain different fixed values for specific activities of the tracer system. The two counters are compared to maximum values at specific measuring time intervals and are reset. When, on the basis of the two counters or on the basis of an interface to the overload defense system of the real-time system, the monitoring means of the invention finds that a continuation of the trace procedure would jeopardize the system operation, then the monitoring means deactivates the tracer system. When this deactivation likewise has a negative influence on the real-time behavior of the real-time system, then the deactivation is undertaken step-by-step without occupying too much time at one time.

The monitoring means of the invention can be deactivated by the operator when an error analysis under overload conditions is required. The operator can limit this deactivation to specific overload levels.

FIG. 1 shows the execution of a trace method with reference to the individual software means of a software tracer system.

In a first method step, an input means (EIN) receives definitions for the individual trace points from the operator of the tracer system. Either addresses in the program memory (replacing the original commands by probes) or memory areas to be monitored by the tracer system are thereby defined as trace points by writing specific hardware registers. Further, it is thereby determined what data are to be copied when a respective trace point is reached. Further, special functions are defined that are to be executed every time a trace point is reached. The special functions, for example, can be a matter of additional conditions that must be satisfied when a trace point is reached (for example, stop conditions or events for other tools such as, for example, the operating system tracer that co-logs operating system calls or other special tracers such as, for example, the call tracer that co-logs the message flow within the switching-oriented software).

At the end, the definitions defined by the operator in the first method step are finally combined with a name and are intermediately stored in a trace intermediate memory in the data memory segment of the tracer system.

All inputs activated in the first method step can occur symbolically, i.e. in a syntax that is similar to a source code.

In a second method step, specific program segments that are deposited in the program memory and are called in later at the corresponding trace points are generated by a generator means (GEN) on the basis of the definitions in the first method step. These program segments shall be referred to below as "trace routines." For generating these trace routines, the software tracer system contains a small compiler.

After being generated, the trace routines are deposited in the program memory by the compiler so that they can be called in as soon as a trace point is reached. The trace routine itself then implements all trace functions or, respectively, generates the events. After this, the tested program can be continued with the assistance of a code simulation, which shall be set forth later.

In a third method step, the actual trace event is activated by the operator with the assistance of an activation means AKT. FIG. 2 shows the functioning of the activation means AKT.

For implementing the activation, the activation means first stores the original command located at a trace point address ADP in the trace intermediate memory of the tracer system and then introduces the probe for the trace point into the code or, respectively, activates specific debug registers of the microprocessor. The trace event can also be activated by timers or by other events. A trace event TV is comprised therein that the program to be tested is respectively executed up to a trace point, the trace routine generated for this trace point is then implemented thereat, and finally the execution of the program to be tested is continued.

In addition to the means for activating the trace event, the activation means also contains means for the user to deactivate the trace event. The deactivation on the basis of stop conditions or events for other tools (see the branch block "Stop?" in FIG. 1) is to be distinguished from the deactivation by the operator.

In a fourth method step, the operator can request the data collected by the trace event from an output means (AUS) after deactivation of the trace event. As a result of such a request, the requested data are read from the trace intermediate memory and are symbolically output according to the definition of the trace points.

The system is only minimally dynamically influenced during the trace event, since the call-in of the trace routines is dynamically optimized and the tracer system utilizes all possibilities of the microprocessor in order to in turn continue the tested program as quickly as possible.

The symbolic input and output with the assistance of the input means and output means is realized by access to the symbol tables produced at the compiler.

Upon introduction of the probes for the trace points, the activation means AKT must modify the machine code of the test program in that it overwrites an original command with the corresponding probe of the respective trace point with the assistance of a trap or interrupt command. When, during the execution of the program to be tested, a trace point is then reached, then the processor first branches to the tracer system. This then seeks the corresponding trace routine and implements it. After this, it is assured with the assistance of a small program for code simulation that the program to be tested is immediately continued, namely with the original, overwritten command.

For realizing a traditional continuation of the tested program, a traditional tracer system—the way every conventional debugger does it—would first have to restore the original code modified by the trace point probe, execute the overwritten original command, again branch to the activation means of the tracer system in order to re-introduce the probe, and only then would it continue the tested program following the probe.

In the realization that the exemplary embodiment of the inventive tracer system employs and that is referred to below as code simulation, the two write events in the program memory (restore original code, introduce probe again) with the corresponding write protection and cache handling and the second program interrupt (renewed branch to the activation means) are avoided and considerable time is thereby saved.

The code simulation is comprised therein that a small program (auxiliary code) is already generated by the activation means with the assistance of a continuation means (contained in the activation means) after the storing of the original command (see FIG. 2), this small program serving the purpose of simulating this original command that co-comprises the return address to the tested program and that is started after the execution of the trace routine (see FIG. 4).

A code simulation is especially advantageous in processors that know only a few commands, that are dependent on their address in the main memory, or the current value of the program counter (for example, the command "jump back 20 bytes"). This, for example, is the case given RISC processors.

Further, time can be saved given most RISC processors in that a trace point number is already coded into the TRAP command that is employed for the trace point probe, this trace point number facilitating a search of the trace routine or, respectively, of the administration data of the tracer system needed for the trace event.

FIG. 3 shows the function of a monitoring means SFG of the invention.

The tracer system monitors itself during a trace event in that the monitoring means SFG determines how heavily the tracer system loads the running or activated real-time system, i.e., how much calculating time it occupies. When specific load thresholds are thereby upwardly exceeded, then the tracer system of the invention automatically switches off with the assistance of the monitoring means.

The monitoring means SFG is called at every trace point by a sequencing means ABL for controlling the execution of the trace event and thereby always increments two global counters. The one counter thereby counts how many trace points are hit, whereas the other counter counts the plurality of collected data. At specific time intervals, the two counters are compared to maximum values and are reset. When the monitoring means determines on the basis of the two counters or on the basis of an overload information via an interface to an overload defense system UEL of the real-time system that a continuation of the trace event would jeopardize the system operation, then the monitoring means automatically initiates the deactivation of all trace points via the activation means step-by-step without occupying too much time at one time for this deactivation.

The monitoring means SFG for dynamic self-monitoring can be switched off by the operator when an error analysis is required under overload conditions. This deactivation can be limited to specific overload levels.

FIG. 4 shows the functioning of the afore-mentioned sequencing means ABL for controlling the execution of the trace event. The sequencing means is called at every trace point and initiates various actions in response thereto. First, it calls the monitoring means SFG of the invention. It then seeks the administration data required for a trace point for controlling further execution. This is followed by the call-in of the trace routine that collects the desired data at a trace point and subsequently stores them in a trace intermediate memory ZSP. Finally, the sequencing means calls the program for code simulation that, after its conclusion, automatically jumps to the next command of the program to be tested which lies following the trace point.

Although various minor changes and modifications might be suggested by those skilled in the art, it will be understood that we wish to include within the scope of the patent warranted hereon, all such changes and modifications as reasonably come within our contribution to the art.

We claim as our invention:

1. In a tracer system for error analysis of programs, said programs running in a real-time system, the improvement comprising:

a monitor for determining dynamic load on the real-time system caused by the tracer system and for deactivating the tracer system when the dynamic load upwardly exceeds at least one specific threshold.

2. A tracer system according to claim 1 wherein the monitor determines the dynamic load on the real-time system caused by the tracer system by measuring occurrence of trace points that are encountered and also by measuring average activity per trace point.

3. A tracer system according to claim 1 wherein the monitor determines the dynamic load on the real-time system caused by the tracer system by measuring occurrence of trace points that are encountered and also by measuring activity within a specific measuring time span.

4. A tracer system according to claim 1 wherein the monitor has an interface to a system component of the real-time system via which it receives information about an existing overload level in case of overload; and the monitor deactivates the tracer system when a specific overload level has been reached.

5. A tracer system according to claim 4 wherein: the tracer system is co-implemented as a software system in the real-time system; and the monitor undertakes the deactivation of the tracer system step-by-step given overload.

6. A tracer system according to claim 4 wherein: the tracer system is partially co-implemented on external system components; and the monitor undertakes the deactivation of the tracer system step-by-step given overload.

7. A tracer system according to claim 1 wherein the tracer system is co-implemented as a software system in the real-time system.

8. A tracer system according to claim 1 wherein the tracer system is partially co-implemented on external system components.

9. In a tracer system for error analysis of programs, said programs running in a real-time system, the improvement comprising:

a monitor for determining dynamic load on the real-time system caused by the tracer system and for deactivating the tracer system when the dynamic load upwardly exceeds at least one specific threshold:

the monitor having an interface to a system component of the real-time system via which it receives information about an existing overload level in case of overload, and the monitor deactivating the tracer system when a specific overload level has been reached: and the monitor interface to the system component of the real-time system being to an overload defense system.

10. In a tracer system for error analysis of programs, said programs running in a real-time system, the improvement comprising:

a monitor for determining dynamic load on the real-time system caused by the tracer system and for deactivating the tracer system when the dynamic load upwardly exceeds at least one specific threshold:

the monitor having an interface to a system component of the real-time system via which it receives information about an existing overload level in case of overload, and the monitor deactivating the tracer system when a specific overload level has been reached: and the monitor permitting the specific overload level to be modified by an operator of the tracer system.

11. In a tracer system for error analysis of programs, said programs running in a real-time system, the improvement comprising:

a monitor for determining dynamic load on the real-time system caused by the tracer system and for deactivating the tracer system when the dynamic load upwardly exceeds at least one specific threshold:

the monitor having an interface to a system component of the real-time system via which it receives information about an existing overload level in case of overload, and the monitor deactivating the tracer system when a specific overload level has been reached; and the monitor permitting the specific overload level to be modified by other parts of the system.

12. In a tracer system for error analysis of programs, said programs running in a real-time system, the improvement comprising:

a monitor for determining dynamic load on the real-time system caused by the tracer system and for deactivating the tracer system when the dynamic load upwardly exceeds at least one specific threshold: and wherein the monitor can be unconditionally deactivated by an operator of the tracer system.

13. In a tracer system for error analysis of programs, said programs running in a real-time system, the improvement comprising:

a monitor for determining dynamic load on the real-time system caused by the tracer system and for deactivating the tracer system when the dynamic load upwardly exceeds at least one specific threshold: and wherein the monitor can be unconditionally deactivated by other parts of the system.

14. In a method for error analysis of programs with a tracer system, said programs running in a real-time system, the improvement comprising the steps of:

determining a dynamic load on the real-time system caused by the tracer system; and deactivating the tracer system when the dynamic load upwardly exceeds at least one specific threshold.

15. A method according to claim 14 including the step of determining the dynamic load on the real-time system caused by the tracer system by measuring occurrence of trace points that are encountered and also by measuring average activity per trace point.

16. A method according to claim 14 including the step of determining the dynamic load on the real-time system caused by the tracer system by measuring occurrence of trace points that are encountered and also by measuring activity within a specific measuring time span.

* * * * *